(No Model.)
D. EDLEMAN.
DEVICE FOR RELEASING ANIMALS.
No. 355,306. Patented Jan. 4, 1887.
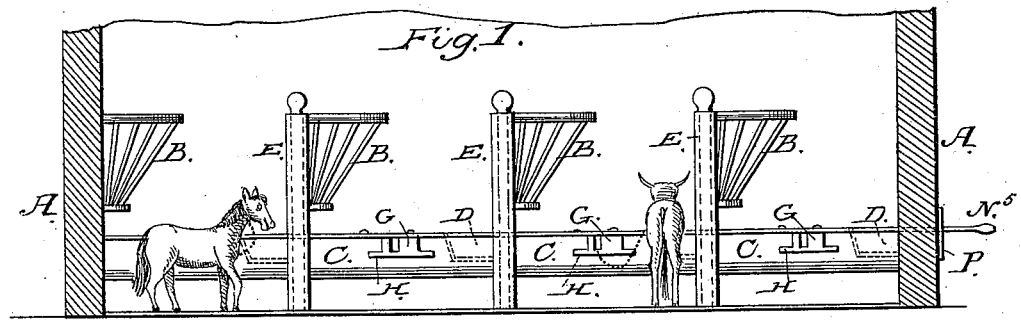
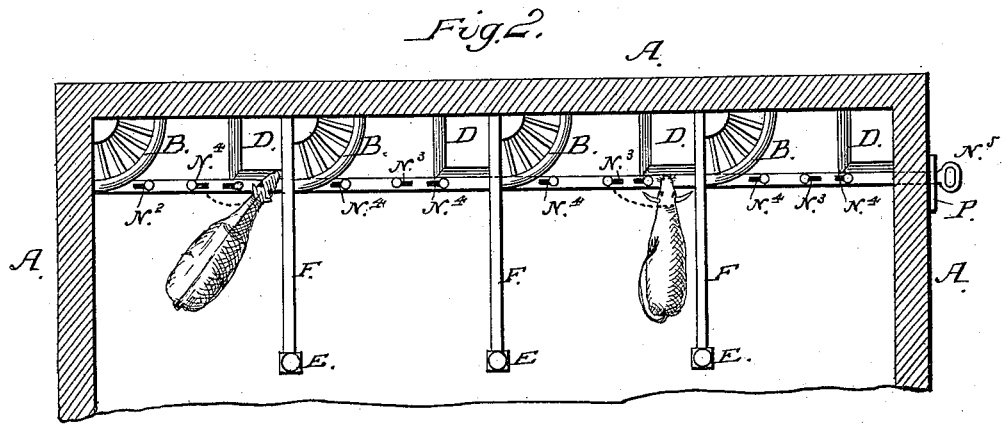
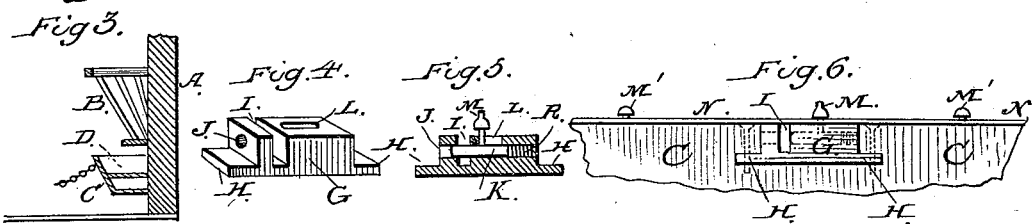
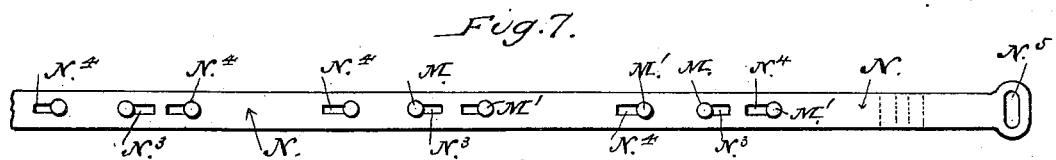
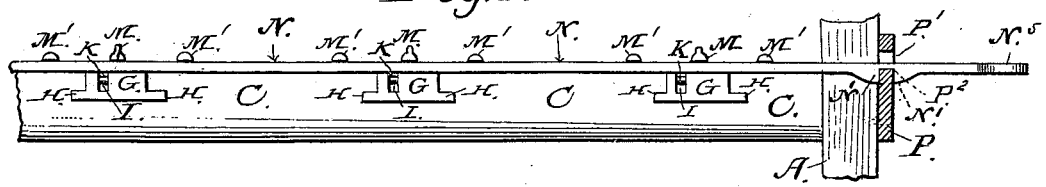
Witnesses
T. Walter Fowler
H. B. Applewhaite
Inventor
Daniel Edleman,
By his Attorney
Thomas P. Husey

UNITED STATES PATENT OFFICE.

DANIEL EDLEMAN, OF KIRBYVILLE, PENNSYLVANIA.

DEVICE FOR RELEASING ANIMALS.

SPECIFICATION forming part of Letters Patent No. 355,306, dated January 4, 1887.

Application filed June 22, 1886. Serial No. 205,871. (No model.)

*To all whom it may concern:*

Be it known that I, DANIEL EDLEMAN, a citizen of the United States, residing at Kirbyville, county of Berks, State of Pennsylvania, have invented a new and useful Improvement in Devices for Releasing Animals, of which the following is a specification.

This improvement is more particularly related to the class of releasing devices in which, by the operation of a single portion thereof, all the cattle attached to the manger upon one side of the barn or stable will be simultaneously released therefrom.

The object of the improvement is to save the lives of the animals secured in the stable when the same is on fire, or when it is desirable to remove the same rapidly, danger being apprehended, the same to be done without risk of limb or life on the part of the party rescuing.

I am aware that a number of releasing devices have been patented; but all of which I have any knowledge are complicated, made up of many pieces, and liable to disarrangement in time of need.

Devices for the above purposes have been introduced where the stalls or partitions forming the same are in combination with the releasing device, and are automatically swung out of the way at the same moment that the cattle attached to the chain or wire rope forming the realeasing device are drawn out of the barn or stable. Theoretically, this mode of saving cattle is perfect; practically, it constitutes a trap. In case the stable is struck by lightning and fired, and one or more of the cattle killed, or if one of the cattle attached should be of a stubborn or vicious disposition, until the dead bodies were removed or the stubborn animal compelled to act in concert with the device the same would be inoperative and the animals would be burned alive.

My experience with animals in time of fire is that, if the animal is released from the stall with its halter-chain dependent from its neck, it will immediately make for a point of exit, and the chances for its escape are good. It is only when cattle are suffering from burning and commence bawling that the rest of the stock, being sympathetically influenced thereby, refuse to make for the doors; but were they simultaneously released they would get out of the barn before burning could occur.

My improvement shown in the drawings herewith, forming a part of this specification, provides for the automatic release of all the cattle ranged in the line of the device; at the same time any of the cattle can be secured or released independently of the others.

Like letters of reference indicate similar parts throughout.

Figure 1 represents a partial elevation of one side of a stable, showing the arrangement of the stalls. Fig. 2 is a plan of the same. Fig. 3 represents a cross-section through the manger; Fig. 4, a perspective view of the keeper-block detached from the front of the manger; Fig. 5, a longitudinal sectional elevation of the keeper-block, showing the locking-bolt in place to secure the halter; Fig. 6, an enlarged elevation of the front of the manger with the keeper-block in place and the bolt drawn back to release the halter-chain; Fig. 7, a plan of a portion of the releasing device represented in its normal position as locked, and Fig. 8 represents in partial elevation the combination of the releasing device with the keeper-blocks.

A represents the walls or frame of the barn or stable, B the hay-racks, C the manger, D the feeding-troughs, E the posts, and F the partitions dividing the space into stalls, all of which differ in no respect from the usual fittings of a modern stable or barn.

Central to the stalls I insert in the front of the manger (an aperture of suitable form having been produced therein) a metallic keeper-block, G, of an oblong form, having ears H, an aperture, I, for the introduction of the halter ring or link, a perforation, J, in a longitudinal direction for the locking-bolt K, an oblong vertical slot, L, at the top intersecting the horizontal perforation J, to permit the movement of the bolt K by the pin M, operated either by hand for individual cattle or by the releasing-strap N for the cattle collectively.

The releasing-strap N is preferably constructed of metal hoop-plate in one continuous length, having pads N' at its outer end, upon its lower face, separated to form a recess, $N^2$, to ride upon the lower edge, $P^2$, of the aperture P' of the plate P, suitably secured to the wall or frame of the barn, upon the outside of the same. Oblong slots $N^3$ coincide with the apertures L of the keeper-blocks, and control the bolts K by their pins M when the strap is drawn outward, or permit the shifting of the bolt K separately by hand for independent locking or release.

Pins M' in the slots N⁴ hold the strap to the top edge of the manger, yet permit a free longitudinal movement of the same. A handle, N⁵, gives control of the device. When in its normal position, as shown, the handle may be secured, to prevent tampering therewith, by a padlock and staple suitably arranged for that purpose.

The operation of the device is as follows: The releasing-strap N, suitably connected with the keeper-blocks and the locking-bolts of the same, as described, is guided upon the upper edge of the manger-front by the pins M' in the slots N⁴. The cattle are driven into the stalls, and each one is separately secured within the same by placing the finger upon the pin M and pressing it toward the handle N,⁵ against the spring R, compressing the same and drawing the bolt K past the aperture I. The ring or link of the halter-chain is inserted in the aperture I, and the pin M released, when the resilience of the spring R shoots the bolt K past the aperture I into the perforation J of the block G, and the animals are securely held until purposely released, singly by repeating the movement described, or collectively from the outside of the barn by seizing the handle N⁵, raising the strap-pads N' out of connection with the plate P and drawing the same toward the operator, when each pin M, contacting with the ends of the slots N³, will be drawn toward the operator, carrying with them the bolts K, simultaneously releasing all the cattle secured in the stalls controlled by said device.

Having shown the construction, operation, and advantages of my improvement, I desire to claim as follows:

1. A releasing device for stables, consisting, essentially, of a strap of suitable material having oblong guiding-slots and intermediate thereto oblong bolt-receiving slots, said slotted strap having a handle upon the outside of the barn or stable, and keeper-pads upon the under face of said strap, in combination with a plate, P, having an aperture, P', and keeper-edge P², pins M M', bolts K, and blocks G, substantially as shown and described, and for the purpose set forth.

2. In a releasing device for cattle in stables, a keeper-block adapted to be secured within the thickness of the manger front, having a longitudinal bolt and spring recess, a bolt and spring, a slotted aperture for the admission of the halter link or ring, a slot, L, and a pin, M, in combination with a releasing-strap, N, having slots N³ N⁴, handle N⁵, and keeper-pads N', pins M', and plate P, substantially as and for the purpose set forth.

3. In a releasing device for cattle secured in stables adapted to be operated from the outside of the same, the combination of the manger front keeper-blocks, locking-bolts, and pins M M' with the strap N, provided with the slots N³ N⁴, the pins M' in the slots N⁴ being adapted to guide the movement of the strap, and the slots N³ to permit an independent movement therein of the pins M, whereby the locking-bolts K may be separately operated for securing or releasing the animals independently of the releasing-strap N, substantially as described, and the purpose set forth.

DANIEL EDLEMAN.

Witnesses:
F. PIERCE HUMMEL,
JAMES W. TYSON.